(12) United States Patent
Heit et al.

(10) Patent No.: US 9,475,412 B2
(45) Date of Patent: Oct. 25, 2016

(54) VEHICLE INCLUDING SEAT HAVING FIRST AND SECOND BIASING MEMBERS

(71) Applicants: Honda Motor Co., Ltd., Minato-ku, Tokyo (JP); TS Tech Americas, Inc., Reynoldsburg, OH (US)

(72) Inventors: Casey Heit, Sandy, UT (US); Hiroshi Okazaki, Columbus, OH (US); Darin D. King, Raymond, OH (US); Tsuyoshi Kumasaka, Dublin, OH (US); Takayuki Inoue, Saitama (JP); Jacob Zachary Sorrell, Columbus, OH (US)

(73) Assignees: TS Tech Americas, Inc., Reynoldsburg, OH (US); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/173,458

(22) Filed: Feb. 5, 2014

(65) Prior Publication Data

US 2014/0217767 A1    Aug. 7, 2014

Related U.S. Application Data

(60) Provisional application No. 61/761,393, filed on Feb. 6, 2013.

(51) Int. Cl.
| | | |
|---|---|---|
| *B60N 2/30* | (2006.01) | |
| *B60N 2/52* | (2006.01) | |
| *B60N 2/54* | (2006.01) | |
| *B60N 2/38* | (2006.01) | |
| *B60N 2/36* | (2006.01) | |

(52) U.S. Cl.
CPC .......... *B60N 2/3013* (2013.01); *B60N 2/3065* (2013.01); *B60N 2/3079* (2013.01); *B60N 2/36* (2013.01); *B60N 2/366* (2013.01); *B60N 2/38* (2013.01); *B60N 2/522* (2013.01); *B60N 2/548* (2013.01)

(58) Field of Classification Search
CPC .... B60N 2/30; B60N 2/3002; B60N 2/3004; B60N 2/3009; B60N 2/3013; B60N 2/302; B60N 2/3025; B60N 2/3075; B60N 2/3077; B60N 2/3079; B60N 2/3095; B60N 2/36; B60N 2/38; B60N 2/4435; B60N 2/444; B60N 2/503; B60N 2/52; B60N 2/522; B60N 2/525; B60N 2/527; B60N 2/54; B60N 2/548; B60N 2/2002; B60N 2/363
See application file for complete search history.

(56) References Cited

U.S. PATENT DOCUMENTS

| 2,916,325 | A | * | 12/1959 | Estes et al. | 296/66 |
|---|---|---|---|---|---|
| 3,114,576 | A | * | 12/1963 | Herider et al. | 297/354.1 |
| 3,328,077 | A | * | 6/1967 | Krasinski | 297/378.14 |

(Continued)

FOREIGN PATENT DOCUMENTS

| DE | 1286415 B | * | 1/1969 | B60N 2/30 |
|---|---|---|---|---|
| DE | 102004017212 B3 | * | 6/2005 | B60N 2/30 |

(Continued)

*Primary Examiner* — Glenn Dayoan
*Assistant Examiner* — Paul Chenevert
(74) *Attorney, Agent, or Firm* — Arent Fox LLP

(57) ABSTRACT

A vehicle includes a seat that comprises a seat bottom, a seat back, a first biasing member, and a second biasing member. The seat back is pivotable between a stowed position and a deployed position. The first biasing member is coupled to each of the seat back and the bed frame. The second biasing member is coupled to each of the seat back and the bed frame.

20 Claims, 12 Drawing Sheets

(56) References Cited

U.S. PATENT DOCUMENTS

| | | | |
|---|---|---|---|
| 3,744,843 A | 7/1973 | Barecki et al. | |
| 4,191,417 A | 3/1980 | Ferrara | |
| 4,493,505 A * | 1/1985 | Yamawaki et al. | 296/63 |
| 6,019,413 A * | 2/2000 | Scraver et al. | 296/66 |
| 6,179,363 B1 * | 1/2001 | Palajac et al. | 296/65.03 |
| 6,588,822 B1 * | 7/2003 | Duvall, Jr. | 296/57.1 |
| 6,896,309 B2 | 5/2005 | Satoh et al. | |
| 6,905,159 B1 * | 6/2005 | Saito et al. | 296/65.01 |
| 6,916,057 B2 | 7/2005 | Teich | |
| 7,108,306 B2 | 9/2006 | Suda et al. | |
| 7,192,088 B1 | 3/2007 | Trombley et al. | |
| 7,243,974 B2 | 7/2007 | Kondo et al. | |
| 7,597,375 B2 | 10/2009 | Takatsura et al. | |
| 8,313,133 B2 * | 11/2012 | King | B60P 1/28 296/183.2 |
| 8,360,496 B2 | 1/2013 | Farcas et al. | |
| 8,567,846 B1 * | 10/2013 | Stevens et al. | 296/183.1 |
| 8,752,879 B1 * | 6/2014 | Heit et al. | 296/67 |
| 8,833,855 B2 * | 9/2014 | Dilsen et al. | 297/291 |
| 2004/0031639 A1 | 2/2004 | Deves et al. | |
| 2005/0184559 A1 * | 8/2005 | Saito et al. | 296/190.08 |
| 2006/0097538 A1 * | 5/2006 | Villeminey | 296/65.09 |
| 2007/0096492 A1 * | 5/2007 | Austin | 296/50 |
| 2008/0315654 A1 * | 12/2008 | Boudinot et al. | 297/378.1 |
| 2009/0184536 A1 * | 7/2009 | Kubota | 296/65.09 |
| 2009/0184537 A1 * | 7/2009 | Yamamura et al. | 296/65.09 |
| 2009/0256388 A1 * | 10/2009 | Tanaka et al. | 296/186.4 |
| 2009/0302630 A1 * | 12/2009 | Duffy et al. | 296/57.1 |
| 2010/0060026 A1 * | 3/2010 | Bowers | 296/66 |
| 2010/0207422 A1 * | 8/2010 | Sayama | 296/66 |
| 2010/0308614 A1 * | 12/2010 | Arnold | 296/37.6 |
| 2010/0320824 A1 * | 12/2010 | Aoki et al. | 297/378.1 |
| 2012/0056460 A1 * | 3/2012 | Baker | 297/331 |
| 2013/0168951 A1 * | 7/2013 | Yamamoto et al. | 280/807 |
| 2013/0168988 A1 * | 7/2013 | Yamamoto et al. | 296/26.08 |
| 2013/0249265 A1 * | 9/2013 | Kaneda et al. | 297/340 |
| 2015/0091323 A1 * | 4/2015 | Oshima | 296/66 |

FOREIGN PATENT DOCUMENTS

| | | | | |
|---|---|---|---|---|
| DE | 102007031069 A1 * | 1/2009 | | B60N 2/36 |
| DE | 102007049646 A1 * | 4/2009 | | B60N 2/34 |
| DE | 102008015608 B3 * | 4/2009 | | B60R 5/00 |

* cited by examiner

VEHICLE INCLUDING SEAT HAVING FIRST AND SECOND BIASING MEMBERS

REFERENCE TO RELATED APPLICATION

The present application claims priority of U.S. provisional application Ser. No. 61/761,393, filed Feb. 6, 2013.

TECHNICAL FIELD

A vehicle includes a left rear seat and a right rear seat.

BACKGROUND

Certain conventional vehicles include a utility bed which is movable between a hauling position and a dumping position. Such a utility bed is often referred to as a "dump bed" and is suitable to selectively facilitate transportation of cargo.

SUMMARY

In accordance with one embodiment, a vehicle comprises a vehicular frame and a utility bed pivotally coupled with the vehicular frame. The utility bed is pivotable between a hauling position and a cargo support position. The utility bed comprises a bed frame and a seat. The seat comprises a seat bottom, a seat back, a first biasing member, and a second biasing member. The seat bottom is coupled with the bed frame. The seat back is pivotally coupled with respect to the bed frame and is pivotable between a stowed position and a deployed position. The first biasing member is coupled to each of the seat back and the bed frame. The first biasing member is configured to bias the seat back into the stowed position. The second biasing member is coupled to each of the seat back and the bed frame. The second biasing member is configured to bias the seat back into the deployed position.

In accordance with another embodiment, a vehicle comprises a vehicular frame and a utility bed coupled with the vehicular frame. The utility bed comprises a bed frame, a seat, and a cushion member. The seat comprises a seat bottom, a seat back, a first spiral torsion spring, and a second spiral torsion spring. The first spiral torsion spring comprises a first end and a second end. The first end is coupled with the bed frame and the second end is coupled with the seat back. The second spiral torsion spring comprises a third end and a fourth end. The second end is coupled with the bed frame and the fourth end is coupled with the seat back. The cushion member is pivotally coupled to each of the bed frame and the seat back, and is configured to dampen movement of the seat back into each of the stowed position and the deployed position. The first and second spiral torsion springs are wound in opposite directions with respect to one another.

BRIEF DESCRIPTION OF THE DRAWINGS

Various embodiments will become better understood with regard to the following description, appended claims and accompanying drawings wherein:

DETAILED DESCRIPTION

Certain embodiments are hereinafter described in detail in connection with the views of FIGS. 1-12, wherein like numbers indicate the same or corresponding elements throughout the views. A utility vehicle can include a utility bed which can be used to facilitate hauling of cargo by the utility vehicle. In one embodiment, the utility vehicle can be a dump-type utility vehicle having a utility bed that can facilitate selective dumping of cargo from the utility bed. A dump-type utility vehicle can comprise a light utility vehicle, such as the utility vehicle 10 shown in FIGS. 1-12. In other embodiments, a dump-type utility vehicle can comprise any of a variety of other types of utility vehicles having a utility bed capable of dumping (e.g., a dump bed) such as, for example, a pickup truck, a dump truck, an all terrain vehicle ("ATV"), a golf cart, or other similar type of vehicle, for example. In another embodiment, the utility vehicle can include a non-dump type utility vehicle having a utility bed that is rigidly fixed to the utility vehicle's frame (e.g., a non-dumpable bed). In yet another embodiment, the utility vehicle can include a trailer.

Figure 1:
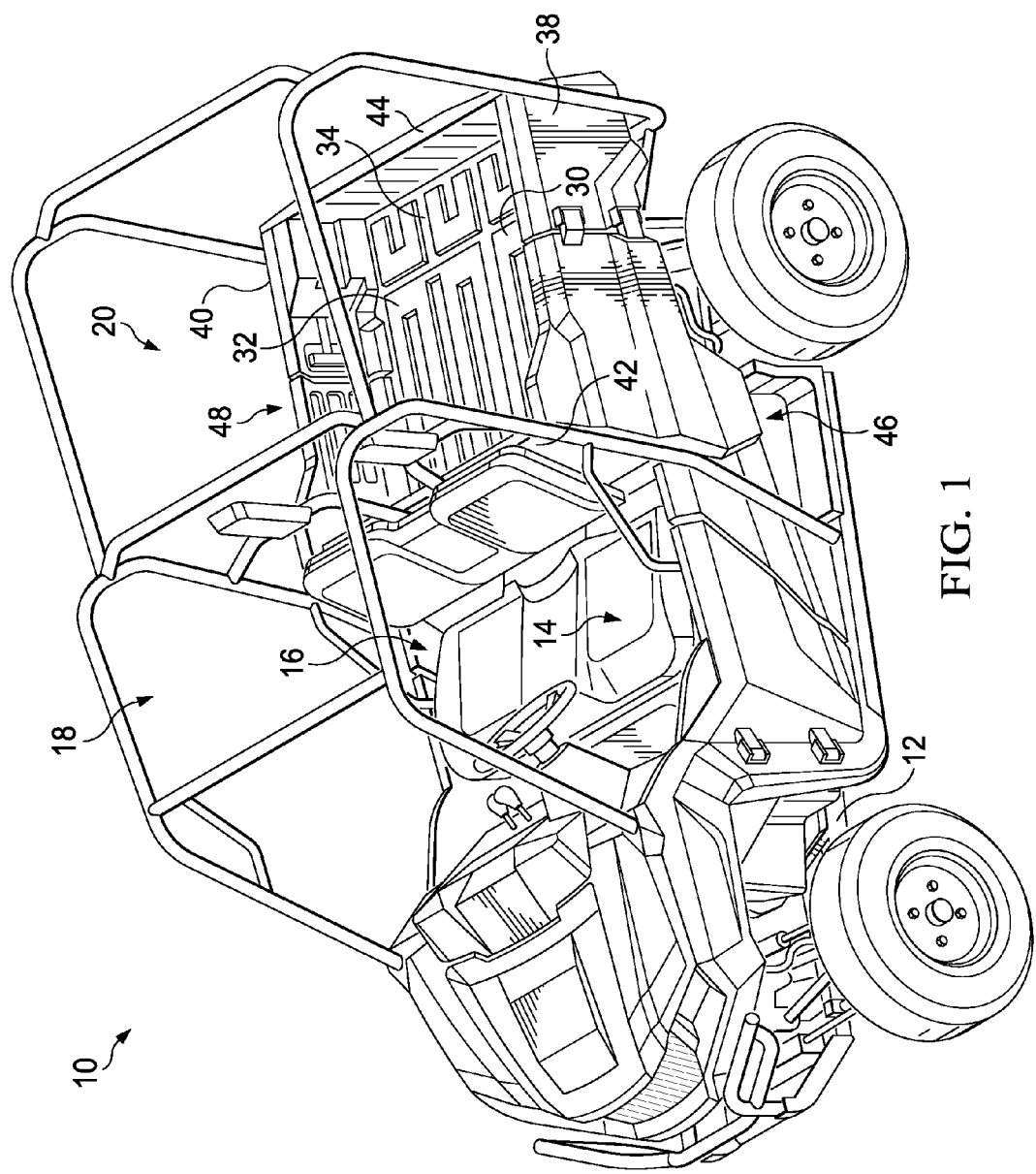
FIG. 1 is a left side perspective view depicting a vehicle having a utility bed that includes left and right rear seats in respective stowed positions, in accordance with one embodiment.

Referring to FIG. 1, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). A left front seat 14 and a right front seat 16 can each be supported by the vehicular frame 12 and can facilitate support of occupants within a passenger compartment 18. The utility vehicle 10 can also include a utility bed 20 which is coupled with the vehicular frame 12, either directly or indirectly, and such as through use of a hinge assembly (not shown). The hinge assembly can facilitate pivotable movement of the utility bed 20 with respect to the vehicular frame 12, and between a hauling position (shown in FIG. 1) and a dumping position (shown in FIG. 11).

Figure 2:
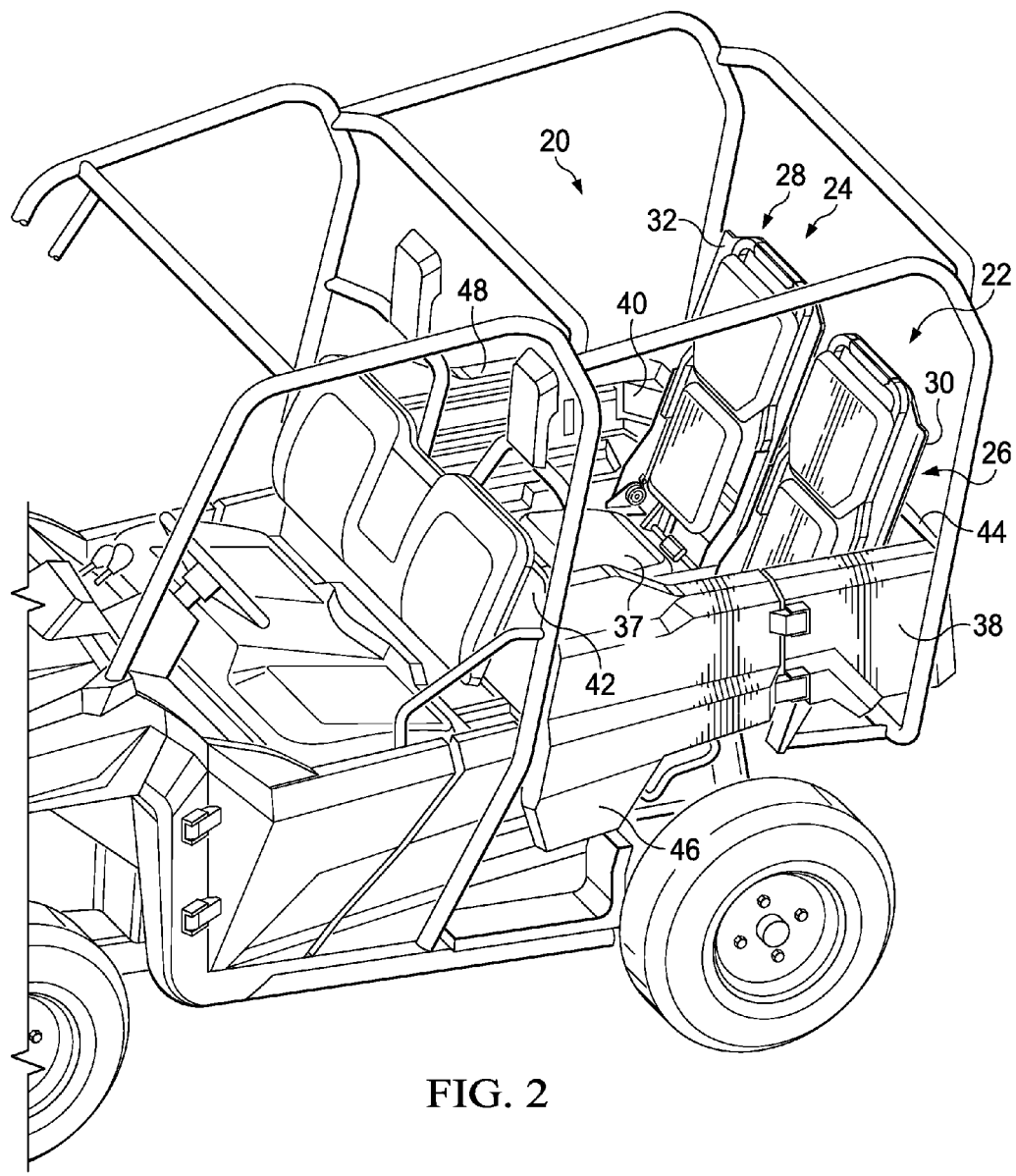
FIG. 2 is a left side perspective view depicting the vehicle of FIG. 1 but with the left and right rear seats in respective deployed positions.

As illustrated in FIG. 2, the utility bed 20 can include a left rear seat 22 and a right rear seat 24 that can include a left seat back 26 and a right seat back 28, respectively. The left and right seat backs 26, 28 can each be pivotally coupled with respect to a bed frame 45 of the utility bed 20. In one embodiment, the left and right seat backs 26, 28 can be pivotally coupled to the bed frame 45, either directly, or indirectly (e.g., through attachment to left and right seat bottoms 36, 37 which can in turn be attached directly to the bed frame 45). In other embodiments, left and right seat backs can be pivotally coupled to another portion of the utility bed or vehicle. Each of the left and right seat backs 26, 28 can be selectively and independently pivotable between a stowed position (FIG. 1) and a deployed position (FIG. 2). When the left and right seat backs 26, 28 are in their stowed positions, their respective cover panels 30, 32 can facilitate support of cargo within the utility bed 20. For example, the utility bed 20 is shown in FIG. 1 to comprise a bed floor 34 adjacent to the left and right rear seats 22, 24. When the left and right seat backs 26, 28 are in their respective stowed positions, the left and right cover panels 30, 32 can cooperate with the bed floor 34 to define a cargo support surface for the utility bed 20. When the left and right seat backs 26, 28 are in their deployed positions, as illustrated in FIG. 2, the left and right seat backs 26, 28 can cooperate with the respective left and right seat bottoms 36, 37 to facilitate support of passengers behind the left front seat 14 and the right front seat 16, respectively. The left and right seat bottoms 36, 37 can include respective cushions for providing underlying support to a seated passenger. As will be described in further detail below, each of the left and right seat backs 26, 28 can include a respective pair of spiral torsion springs and a respective seat damper. Each pair of spiral torsion springs and seat damper can cooperate to prevent the respective seat backs from slamming closed or open when the utility bed 20 is moved between the cargo support position and the dumping position, respectively.

The utility bed 20 is shown to include a left side wall 38 and a right side wall 40 extending generally perpendicularly from the bed floor 34 or locations adjacent to the bed floor 34. The utility bed 20 is also shown to include a front wall 42 and a tailgate 44. The tailgate 44 can be pivotally coupled with respect to the bed floor 34. When the utility bed 20 is in the hauling position (shown in FIG. 1), the left side wall 38, the right side wall 40, and the front wall 42 can cooperate with the bed floor 34 to retain cargo within the utility bed 20. The tailgate 44, when closed (as shown in FIGS. 1 and 2), can also cooperate with the left side wall 38, the right side wall 40, and the bed floor 34 to retain cargo within the utility bed 20. It will be appreciated that the tailgate 44 can be selectively opened to facilitate loading of the utility bed 20 and/or to allow cargo (e.g., dirt) to pour from the utility bed 20 when the utility bed 20 is in a dumping position (shown in FIG. 11). In another embodiment, it will be appreciated that a rear wall can be provided in lieu of a tailgate, with the rear wall being rigidly affixed with respect to a bed floor of a utility bed such that it might not be capable of being selectively opened by an operator. In yet another alternative embodiment, it will be appreciated that one or more side walls (e.g., 38 and/or 40) of a utility bed might be capable of being selectively opened (e.g., like tailgate 44) by an operator. In still another alternative embodiment, it will be appreciated that a utility bed might not include any tailgate and/or side walls and might, for example, comprise a flat-bed type configuration.

Figure 4:
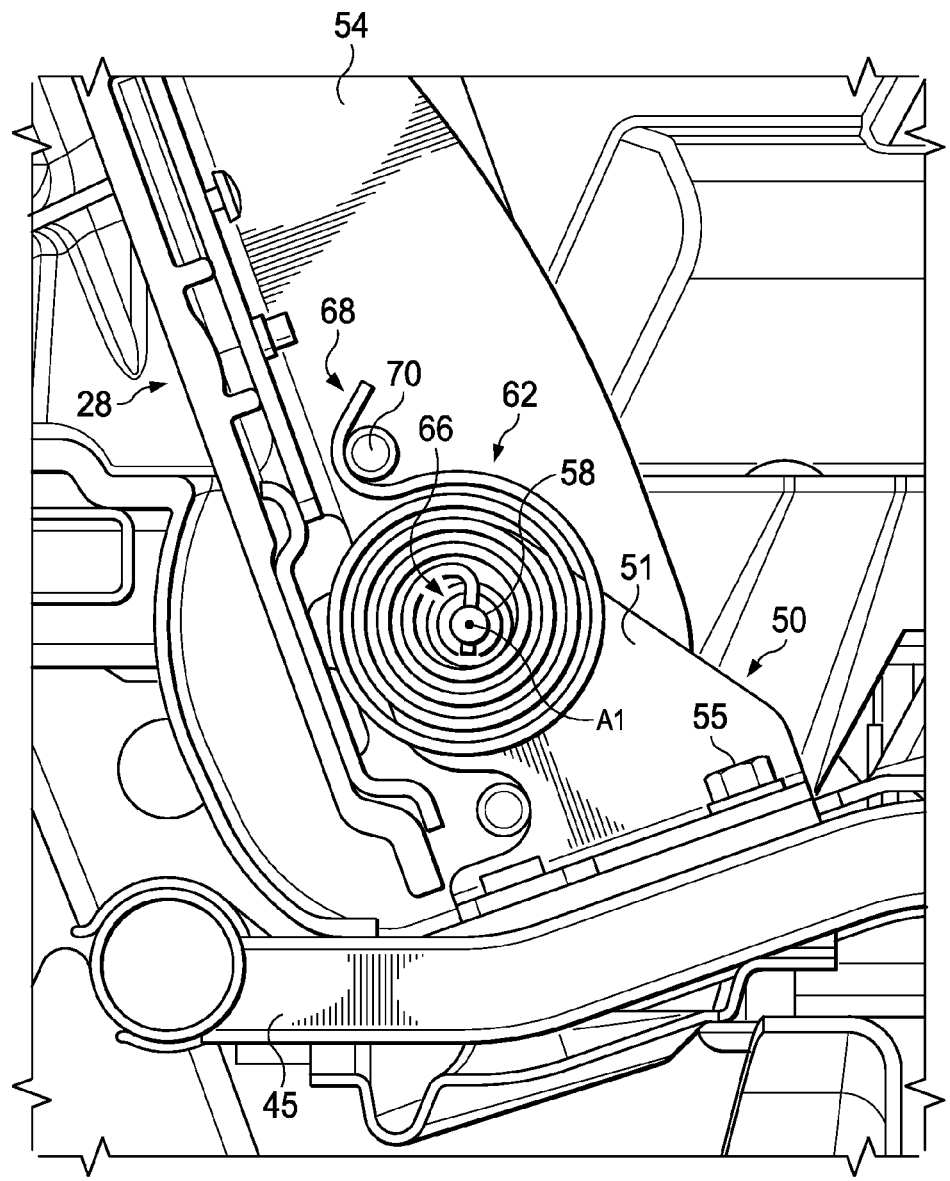
FIG. 4 is a cross-sectional view taken along the line 4-4 in FIG. 3.

As illustrated in FIG. 4, the utility bed 20 can include the bed frame 45 that can be configured to provide underlying and structural support for certain components of the utility bed 20. The bed frame 45 can comprise a tubular frame structure that extends along a perimeter and/or underneath the bed floor 34 and provides underlying support for the bed floor 34, the left and right side walls 38, 40, and/or the front wall 42.

Figure 11:
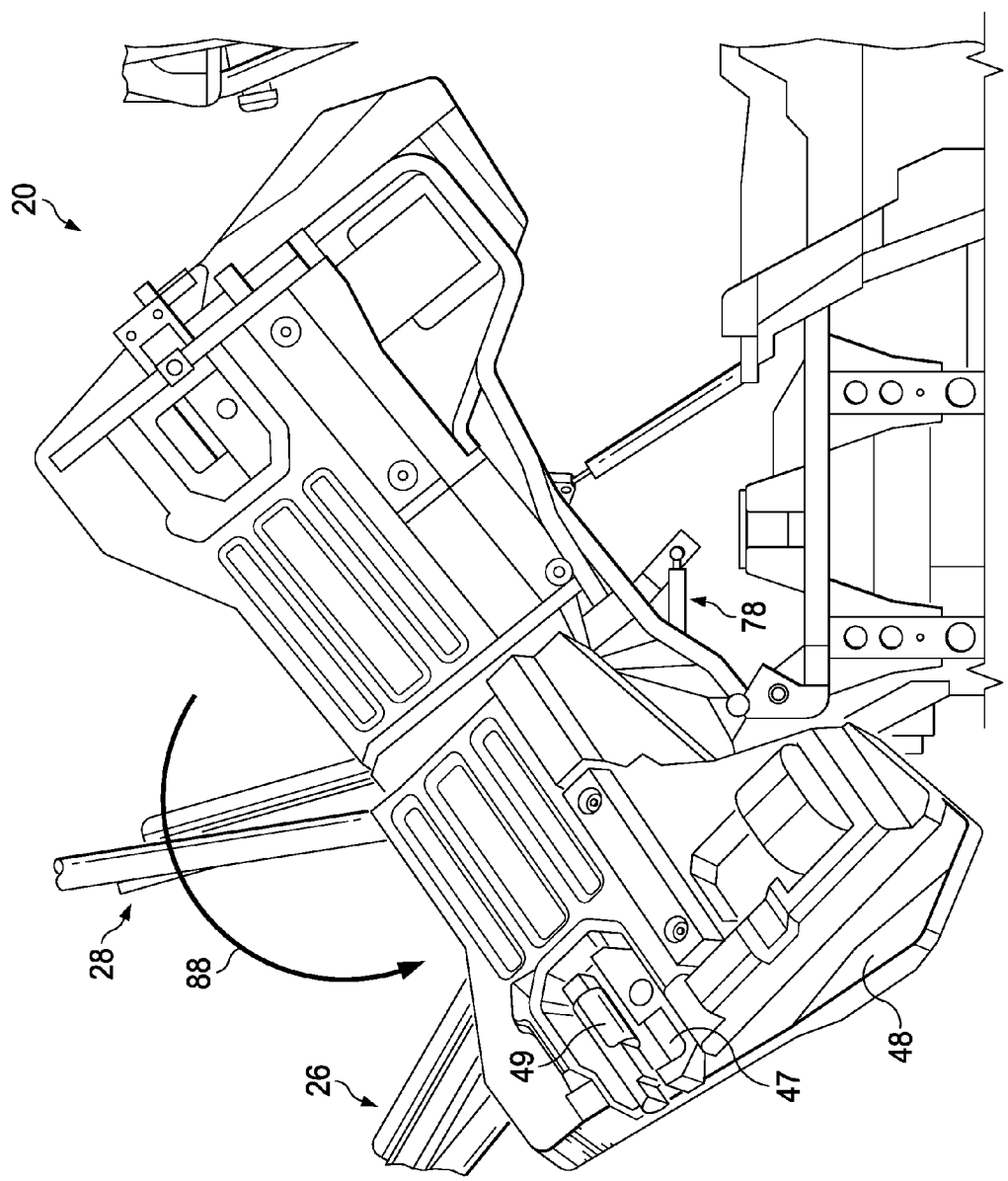
FIG. 11 is a right side view depicting a portion of the vehicle of FIG. 1, but with the utility bed shown in a dumping position, a right door shown in an opened position, and the right seat back shown in the neutral and deployed positions.
Figure 12:
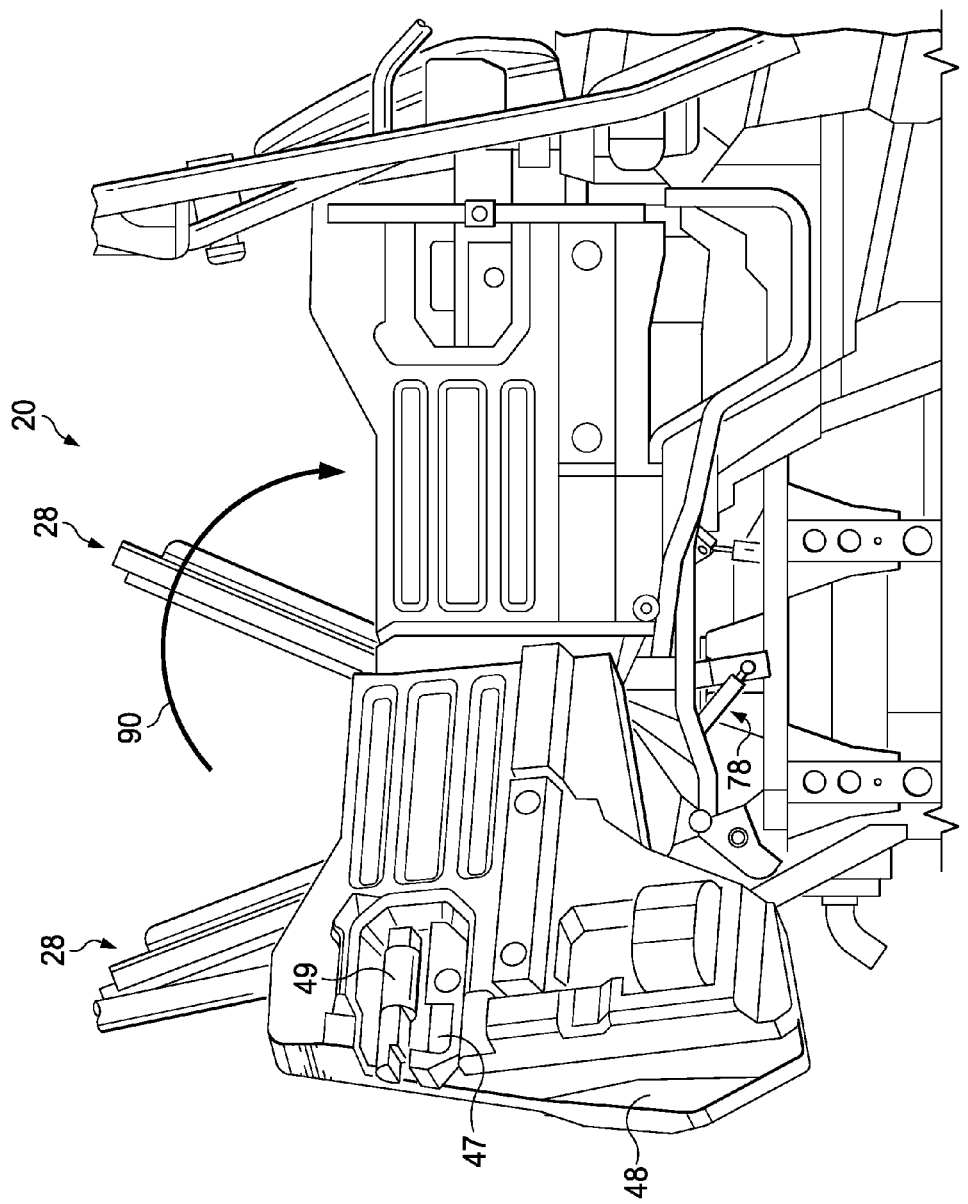
FIG. 12 is a right side view of the arrangement of FIG. 11, but with the utility bed shown in a hauling position.

The utility bed 20 is also shown in FIG. 2 to include respective left and right doors 46, 48 which are each pivotable between a closed position (FIGS. 1 and 2) and an opened position (shown with respect to the right door 48 in FIGS. 11 and 12). When in the closed position, each of the left and right doors 46, 48 can cooperate with the respective left and right side walls 38, 40, the front wall 42, and the bed floor 34 to retain cargo within the utility bed 20. The left and right doors 46, 48 can be moved to the respective opened positions to provide a passenger ingress/egress to/from the left and right rear seats 22, 24.

In one embodiment, the left and right doors 46, 48 can comprise rear-hinged doors that are pivotally attached to the left and right side walls 38, 40, respectively, such that the left and right doors 46, 48 can be selectively opened towards a rear of the utility bed 20. Opening the left and right doors 46, 48 towards the rear of the utility bed 20 can permit more direct access to the left and right rear seats 22, 24 than might otherwise be available with front-hinged doors. It will be appreciated, however, that in certain alternative embodiments, the left and right doors 46, 48 can instead be front-hinged doors or any of a variety of suitable alternate door arrangements.

Each of the left and right doors 46, 48 can include respective latches (e.g., 47 in FIGS. 11 and 12, for right door 48) that can facilitate releasable coupling of the left and right doors 46, 48 in their respective closed positions. The latches (e.g., 47) can be selectively activated through operation of a handle (e.g., 49 in FIGS. 11 and 12 for right door 48) to facilitate opening of the respective left and right doors 46, 48. In one embodiment, a seal (not shown) can be provided along the perimeter of each of the left and right doors 46, 48. Each seal can facilitate selective sealing of the interaction between the door (e.g., 46, 48) and the adjacent side wall (e.g., 38, 40).

Figure 3:
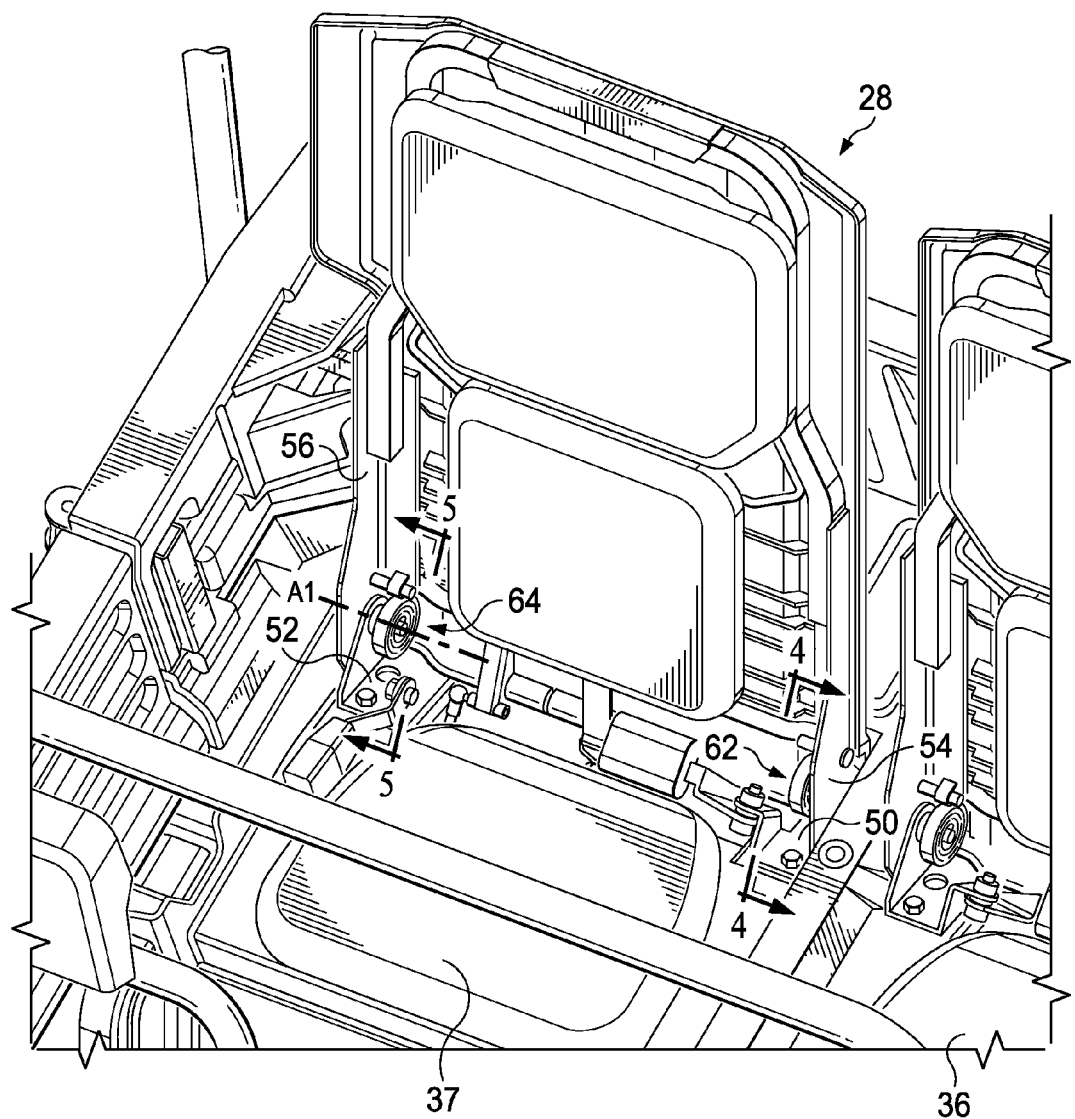
FIG. 3 is an enlarged view depicting a portion of the vehicle of FIG. 2, including the right rear seat.
Figure 5:
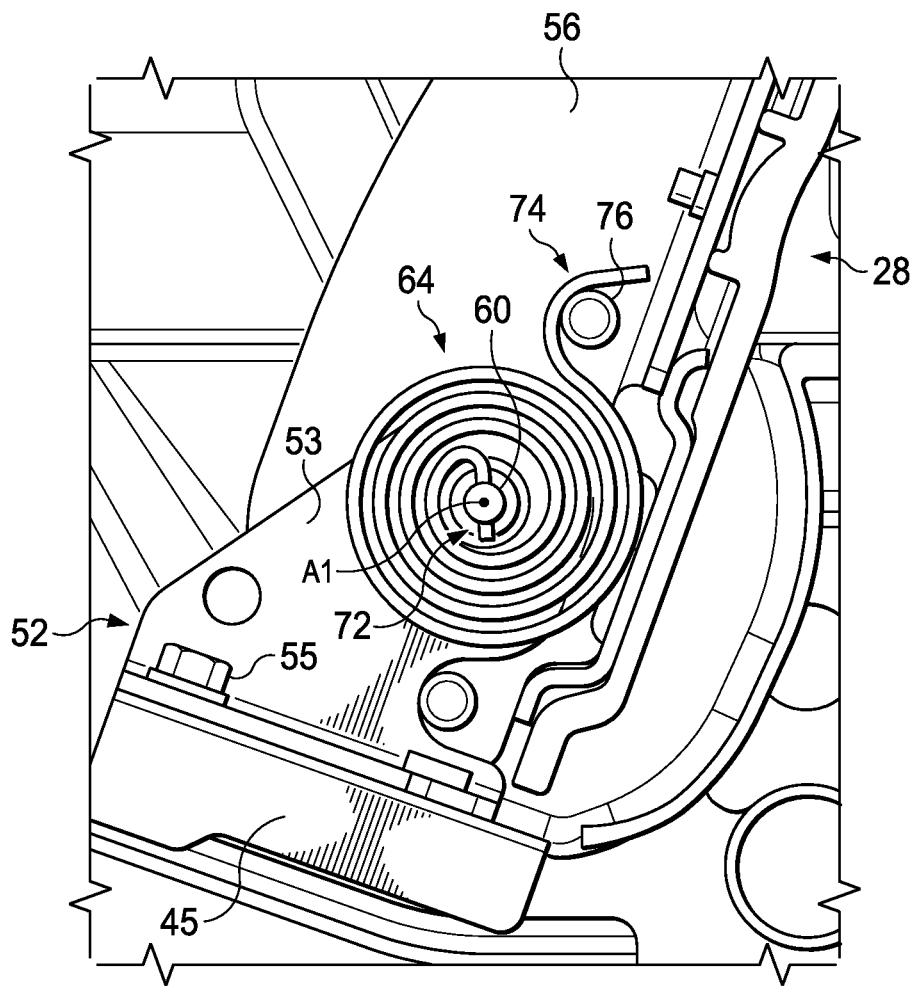
FIG. 5 is a cross-sectional view taken along the line 5-5 in FIG. 3.

Referring now to FIGS. 3-5, the right seat back 28 is shown to be pivotally coupled to the bed frame 45 by left and right back hinges 50, 52. The left and right back hinges 50, 52 can include respective left and right base portions 51, 53, as shown in FIGS. 4-5. The left and right base portions 51, 53 are shown to be attached to the bed frame 45 with bolts (e.g., 55), but can additionally or alternatively be attached to the bed frame 45 in any of a variety of suitable alternative attachment arrangements, such as through welding, for example. The right seat back 28 is shown to include left and right upright frame members 54, 56 that are pivotally coupled to the respective left and right base portions 51, 53 with respective left and right pivot pins 58, 60 such that the right seat back 28 is pivotable about the left and right pivot pins 58, 60. The left and right pivot pins 58, 60 can cooperate to define a pivot axis A1 for the right seat back 28.

In one embodiment, the left and right pivot pins 58, 60 can be rigidly coupled to the left and right base portions 51, 53 such as, for example, in a press fit arrangement or through welding. As such, the right seat back 28 can pivot with respect to the left and right pivot pins 58, 60.

Still referring to FIGS. 3-5, the right rear seat 24 can include left and right spiral torsion springs 62, 64 that are each respectively coupled with the right seat back 28 and the bed frame 45. The left spiral torsion spring 62 can be configured to bias the right seat back 28 into the stowed position and the right spiral torsion spring 64 can be configured to bias the right seat back 28 into the deployed position. As illustrated in FIG. 3, the left spiral torsion spring 62 can be disposed upon a left side of the right seat back 28 (e.g., adjacent to the left base portion 51 and the left upright frame member 54), and the right spiral torsion spring 64 can be disposed upon a right side of the right seat back 28 (e.g., adjacent to the right base portion 53 and the right upright frame member 56).

The left spiral torsion spring 62 can include an inner radial end 66 and an outer radial end 68 that are coupled with the left back hinge 50 and the right seat back 28, respectively. In one embodiment, as illustrated in FIG. 4, the inner radial end 66 can be attached to the left pivot pin 58 such that the left spiral torsion spring 62 is effectively wound around the left pivot pin 58. In one embodiment, the left pivot pin 58 can define a slot (not shown) that is configured to receive the inner radial end 66. In such an embodiment, once the inner radial end 66 is provided through the slot, the inner radial end 66 can be crimped, welded, or otherwise secured to left pivot pin 58 to prevent the inner radial end 66 from inadvertently sliding away from the left pivot pin 58. As illustrated in FIG. 4, the outer radial end 68 can rest against (e.g., engage) a left support member 70 that extends from the left upright frame member 54 adjacent to the left back hinge 50. With the left inner and outer radial ends 66, 68 coupled with the left pivot pin 58 and the left support member 70 in this manner, the left spiral torsion spring 62 can be maintained under tension. The left spiral torsion spring 62 is shown to be wound around the left pivot pin 58 in a counter-clockwise direction (when viewed from the right side of the utility vehicle 10). As such, the left spiral torsion spring 62 can apply a spring force that biases the right seat back 28 into the stowed position.

As illustrated in FIG. 4, the outer radial end 68 can be substantially U-shaped. This U-shaped design can facilitate coupling of the outer radial end 68 to the left support member 70 without requiring use of fasteners or other fastening methods which can be cumbersome and expensive. This U-shaped design can also promote consistent and effective alignment of the outer radial end 68 with respect to the left support member 70 such as when the left spiral torsion spring 62 is installed on the right rear seat 24. The outer radial end 68 can accordingly be installed properly without requiring repeated repositioning of the outer radial end 68 which can be time consuming. When the outer radial end 68 needs to be moved away from the left support member 70, such as to adjust the tension of the left spiral torsion spring 62 (e.g., through winding or unwinding) and/or to install a different left spiral torsion spring 62, the outer radial end 68 can be easily pulled away from the left support member 70 without requiring the releasing of fasteners or the like.

Referring now to FIG. 5, the right spiral torsion spring 64 can be coupled with the right seat back 28 and the bed frame 45 similarly to, or the same in many respects, as the left spiral torsion spring 62. For example, as illustrated in FIG. 5, the right spiral torsion spring 64 can include an inner radial end 72 and an outer radial end 74 that is coupled with the right back hinge 52 and the right seat back 28, respectively. The inner radial end 72 is shown to be attached to the right pivot pin 60 such that the right spiral torsion spring 64 is effectively wound around the right pivot pin 60. The outer radial end 74 can engage a right support member 76 that extends from the right upright frame member 56 adjacent to the right back hinge 52. With the right inner and outer radial ends 72, 74 coupled with the right pivot pin 60 and the right support member 76 in this manner, the right spiral torsion spring 64 can be maintained under tension.

However, the right spiral torsion spring 64 is shown to be wound around the right pivot pin 60 in a clockwise direction (i.e., in an opposite direction as the left spiral torsion spring 62 when viewed from the right side of the utility vehicle 10). As such, the right spiral torsion spring 64 can apply a spring force that biases the right seat back 28 into the deployed position. The left and the right spiral torsion springs 62, 64 are thus wound in opposite directions with respect to each other and can impart opposing pivotal forces to the right seat back 28.

Figure 6:
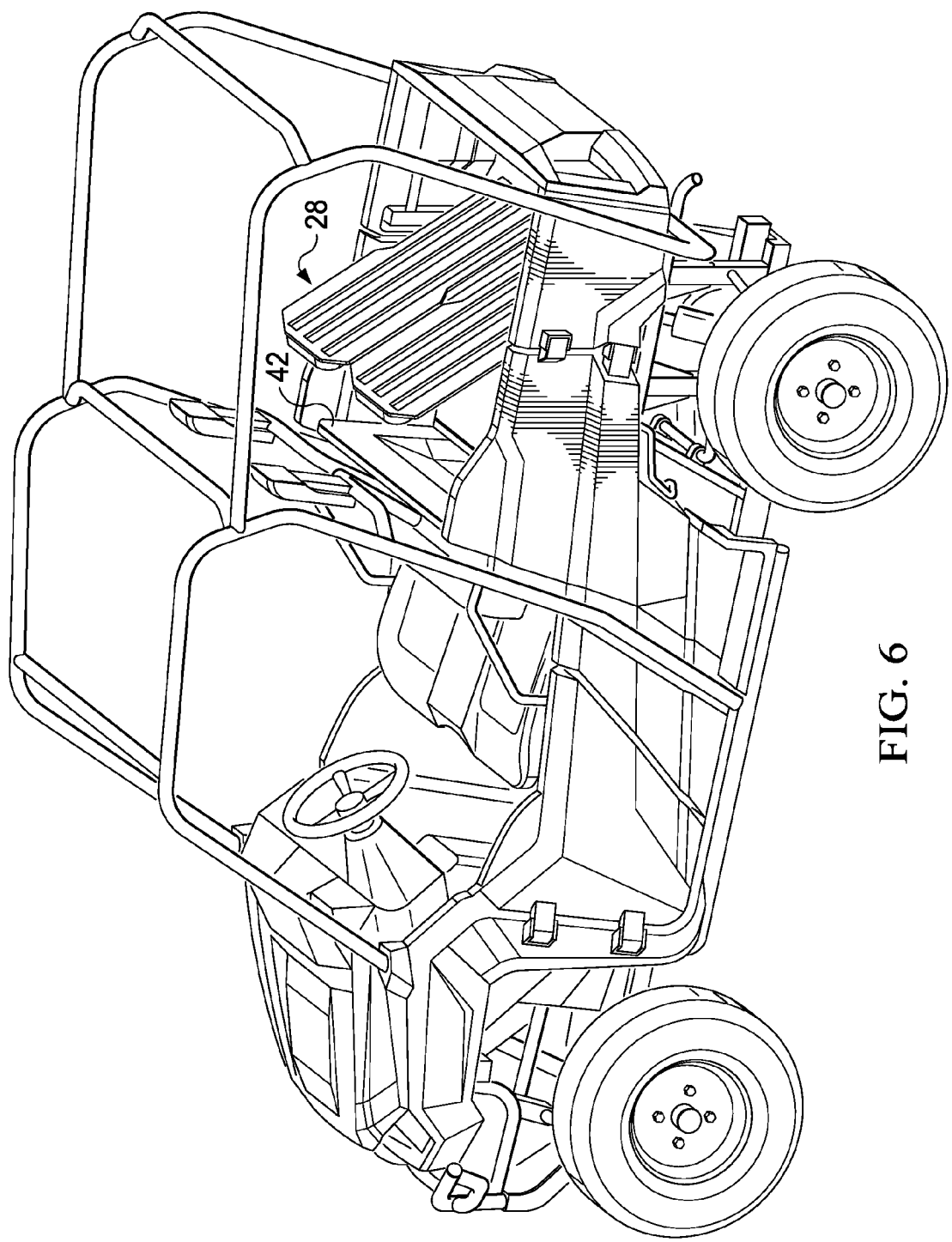
FIG. 6 is a left side perspective view depicting the vehicle of FIG. 1, but with the left and right rear seats in respective neutral positions.
Figure 7:
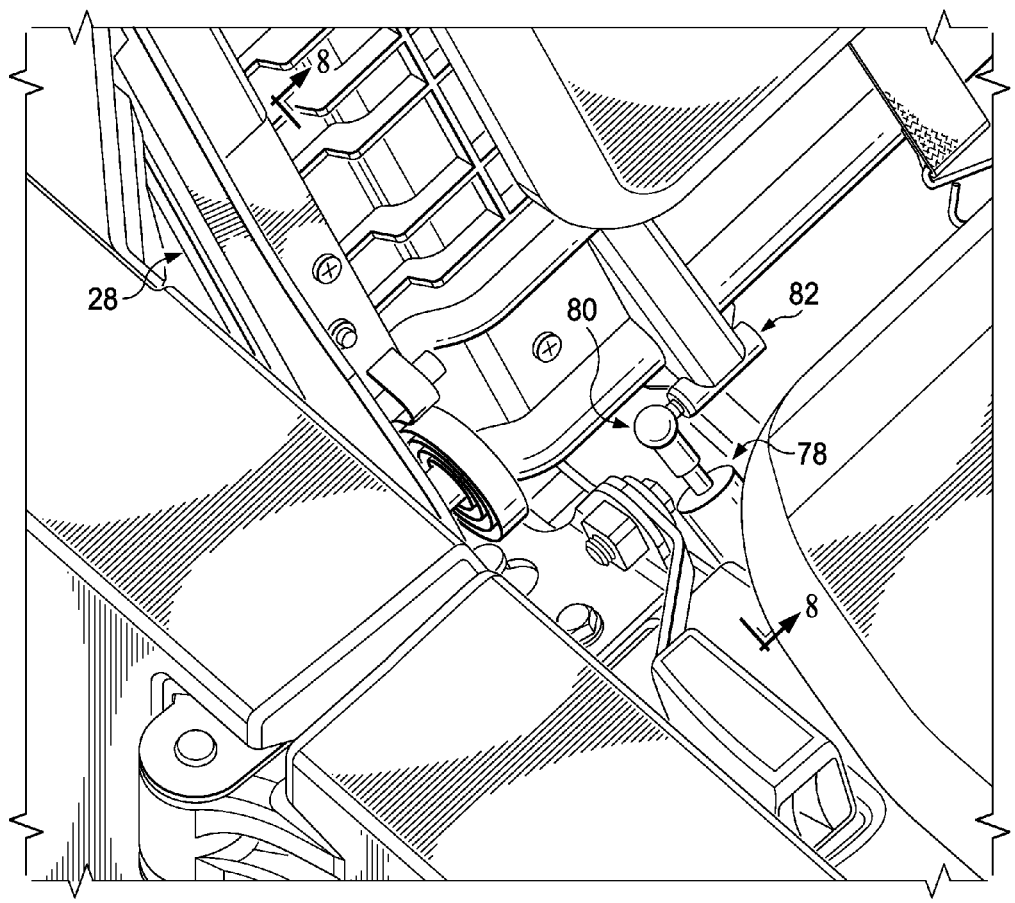
FIG. 7 is an enlarged view depicting a portion of the vehicle of FIG. 2, wherein a seat damper coupled with the right rear seat can be seen.
Figure 8:
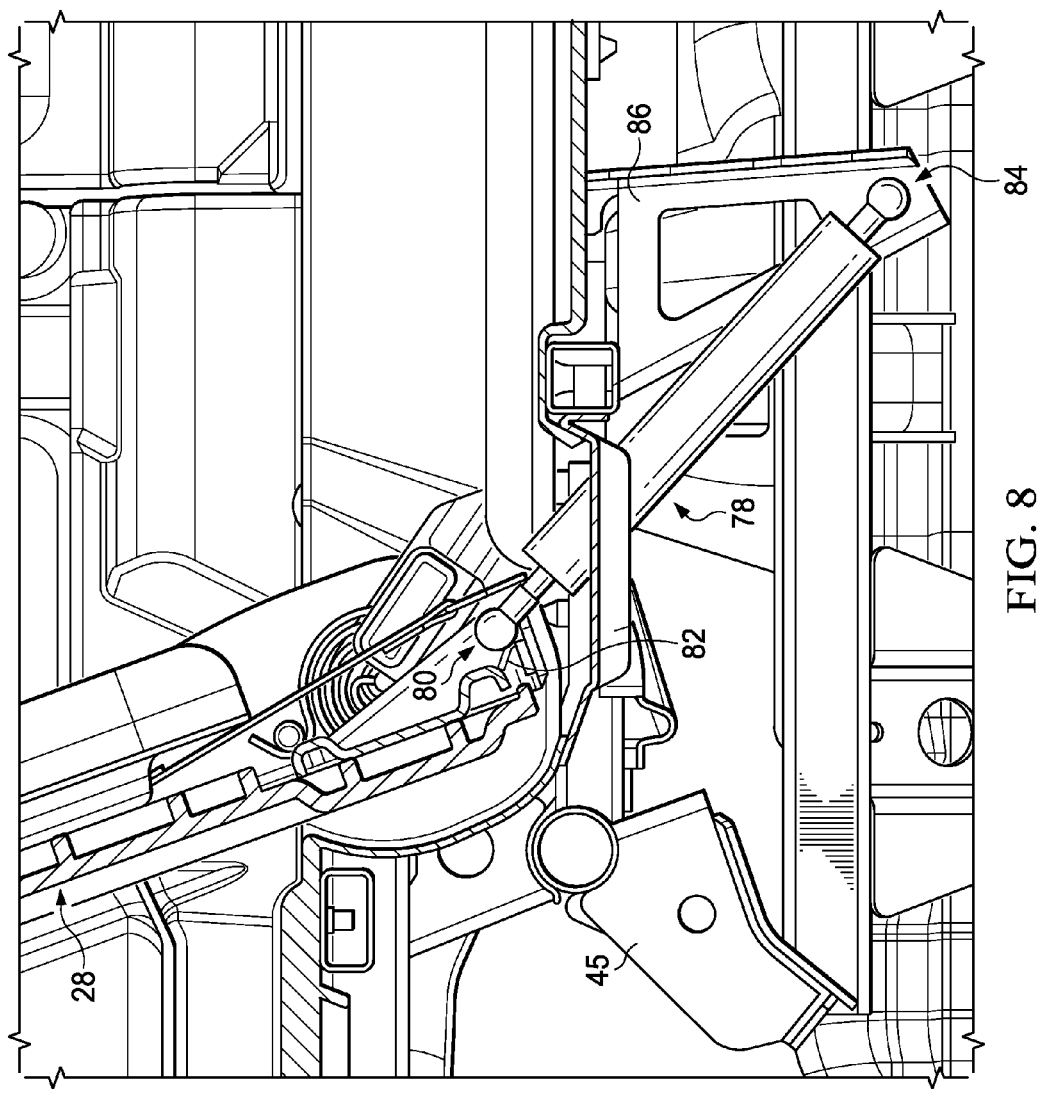
FIG. 8 is a cross-sectional view taken along the line 8-8 in FIG. 7.
Figure 9:
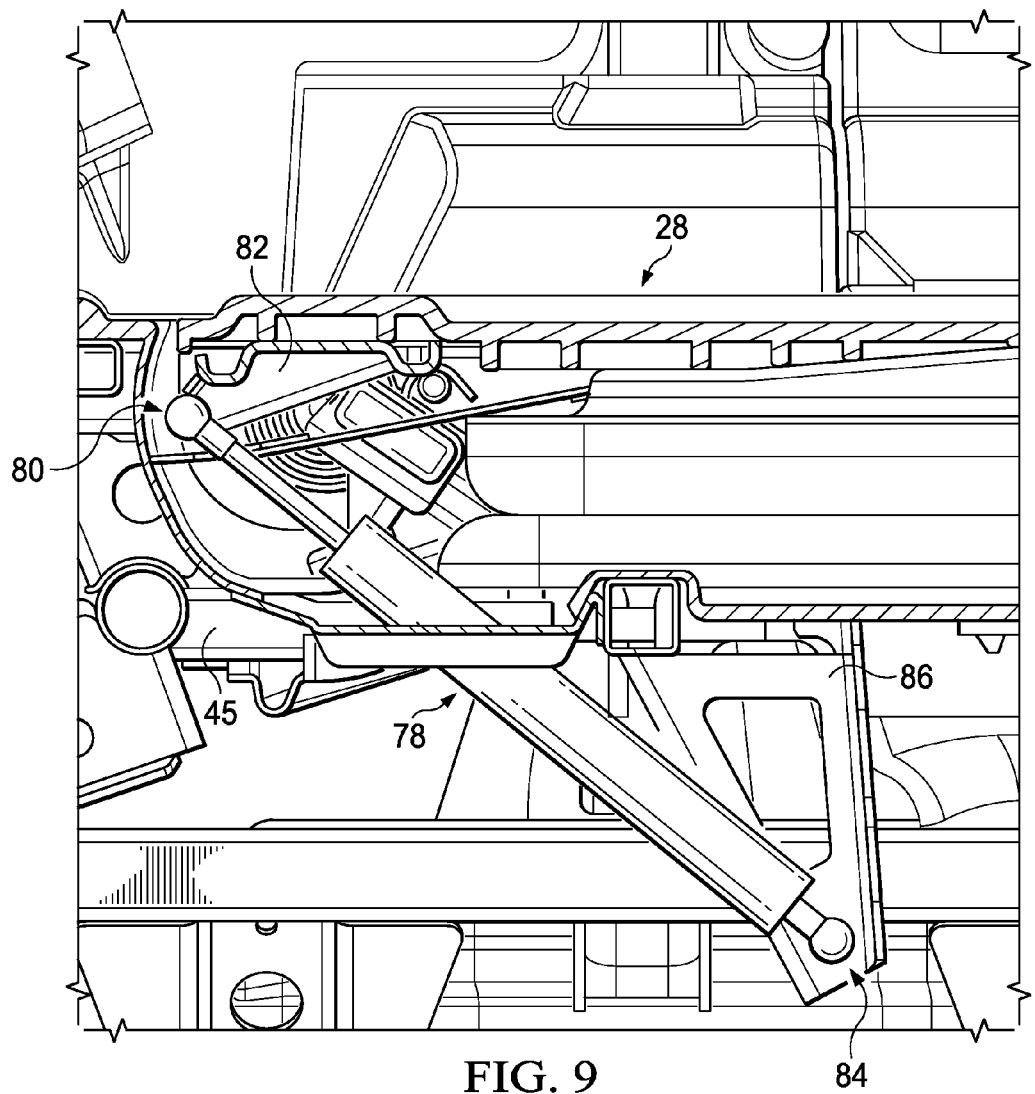
FIG. 9 is a cross-sectional view taken along the line 8-8 in FIG. 7 but with the right seat back shown in the stowed position.
Figure 10:
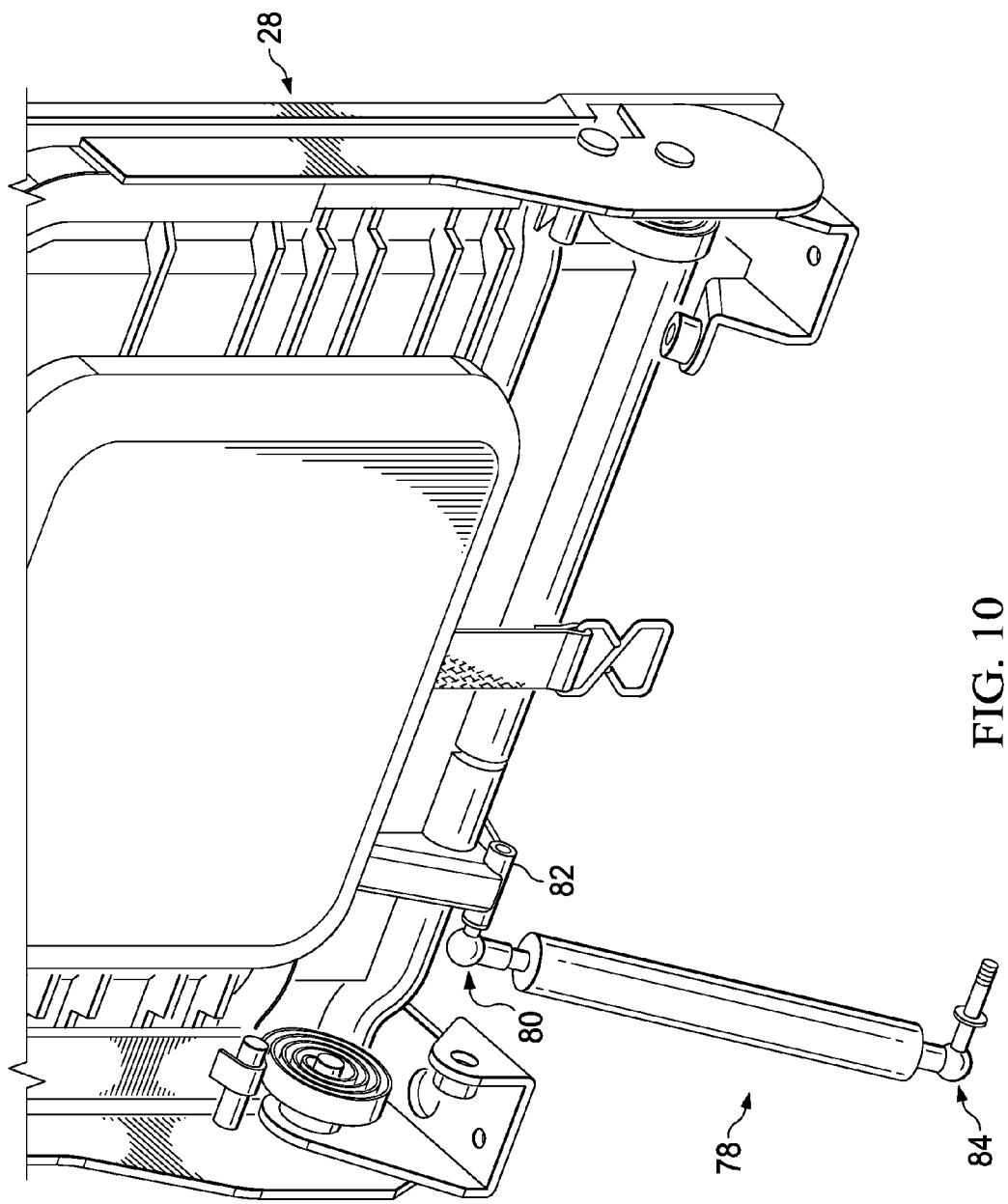
FIG. 10 is an enlarged view depicting the right seat back and the seat damper along with various other components apart from the rest of the vehicle of FIG. 1.

The respective spring forces of the left and the right spiral torsion springs 62, 64 can be selected such that, when the right seat back 28 is released from either the stowed or deployed position, the right seat back 28 can automatically pivot into in a neutral position (e.g., when the net spring force of the left and right spiral torsion springs 62, 64 is about zero), as illustrated in FIG. 6. For example, when the right seat back 28 is released from the stowed position (FIG. 1), the spring force of the right spiral torsion spring 64 can be greater than that of the left spiral torsion spring 62 such that the right seat back 28 is biased upwardly. The right seat back 28 can therefore automatically pivot out of the stowed position until it reaches the neutral position (e.g., when the spring forces of the left and right spiral torsion springs 62, 64 are equalized). Conversely, when the right seat back 28 is released from the deployed position, the spring force of the left spiral torsion spring 62 can be greater than that of the right spiral torsion spring 64 such that the right seat back 28 is biased downwardly. The right seat back 28 can therefore automatically pivot out of the deployed position until it reaches the neutral position (e.g., when the spring forces of the left and right spiral torsion springs 62, 64 are equalized). It will be appreciated, therefore, that when the right seat back 28 is released from the deployed or stowed position, the right seat back 28 can automatically move into a position that facilitates convenient further manual pivoting of the right seat back 28 by an operator. It will also be appreciated that, although the neutral position is shown to be about midway between the stowed and deployed positions, the respective spring forces of the left and the right spiral torsion springs 62, 64 can be selected to hold the right seat back 28 in a variety of different neutral positions.

As illustrated in FIGS. 7-10, the utility bed 20 can include a seat damper 78 that is pivotally coupled to the right seat back 28 and the bed frame 45. The seat damper 78 can be configured to dampen movement of the right seat back 28 between the stowed position and the deployed position. In one embodiment, as illustrated in FIGS. 7-10, an upper end 80 of the seat damper 78 can be pivotally coupled with a lower portion 82 of the right seat back 28. A lower end 84 of the seat damper 78 can be pivotally coupled with a lower vertical extension 86 of the bed frame 45. In one embodiment, the upper and lower ends 80, 84 of the seat damper 78 can be pivotally coupled with the lower portion 82 and the lower vertical extension 86, respectively, by respective spheroidal-joint arrangements, but in other embodiments, they can be pivotally coupled using any of a variety of suitable alternative arrangements. The seat damper 78 can comprise a bi-directional linear damper that is configured to dampen the pivoting of the right seat back 28 into the deployed position as well as the stowed position.

It will be appreciated that the left rear seat 22 can be similar in many respects to the right rear seat 24, but instead disposed upon a left side of the utility bed 20 for seating of a passenger behind the left front seat 14. It will also be appreciated that, although spiral torsion springs are described above, any of a variety of suitable alternative biasing member arrangements can be coupled to each of a seat back and a bed frame and configured to facilitate simultaneous biasing of the seat back into stowed and deployed positions. It will be appreciated that if the left seat back 26 and/or the right seat back 28 is/are not locked in the deployed or stowed position during pivoting of the utility bed 20, their respective spiral torsion springs (e.g., 62, 64) and their respective seat damper (e.g., 78) can cooperate to prevent sudden pivoting of the left and/or right seat backs 26, 28.

It will be appreciated that the left and right torsion springs 62, 64 can cooperate with the seat damper 78 to prevent the right seat back 28 from slamming either closed or opened when the utility bed 20 is moved between the cargo support position and dumping position, respectively, which can reduce the likelihood of items becoming inadvertently pinched by the right seat back 28. In this regard, operation of the right seat back 28 will now be described with reference to FIGS. 11-12. When the right seat back 28 is provided in the neutral position and the utility bed 20 is then pivoted into the dumping position, as illustrated in FIG. 11, the right seat back 28 can start to pivot into the deployed position, as indicated by arrow 88. The left spiral torsion spring 62, however, can apply a spring force to the right seat back 28 that opposes the movement into the deployed position. Simultaneously, the seat damper 78 can dampen the movement of right seat back 28. As a result, the pivoting of the right seat back 28 can be slowed, such as to prevent slamming into the deployed position. Conversely, when the right seat back 28 is provided in the neutral position and the utility bed 20 is then pivoted into the hauling position, as illustrated in FIG. 12, the right seat back 28 can start to pivot into the stowed position, as indicated by arrow 90. The right spiral torsion spring 64, however, can apply a spring force that opposes the movement of the right seat back 28 into the stowed position. Simultaneously, the seat damper 78 can dampen the movement of right seat back 28. As a result, the pivoting of the right seat back 28 can be slowed, such as to prevent slamming into the stowed position. It will be appreciated that the left rear seat 22 can operate in a similar manner. It will also be appreciated that the seat damper 78 can be any of a variety of suitable alternative cushion member arrangements.

It will also be appreciated that although the embodiment of FIGS. 1-12 illustrates forward facing rear seats which are disposed towards a rear-most portion of the utility bed 20, rear seats can be provided in any of a variety of suitable alternative arrangements. In one alternative embodiment, left and right rear seats can comprise rearward facing seats. In such an embodiment, the left and right side walls may or may not include respective left and right side doors, in alternative embodiments.

Although the embodiments above have been described with respect to individual left and right rear seats, it will be appreciated that, in other embodiments, a utility bed can include more than two seats or less than two seats. In yet another embodiment, a utility bed can provide a bench-type rear seat.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   a vehicular frame; and
   a utility bed pivotally coupled with the vehicular frame and pivotable between a hauling position and a cargo support position, the utility bed comprising:
   a bed frame; and
   a seat comprising:
   a seat bottom coupled with the bed frame;
   a seat back pivotally coupled with respect to the bed frame and pivotable between a stowed position, a deployed position, and a neutral position between the stowed position and the deployed position;
   a first biasing member coupled to each of the seat back and the bed frame,
   the first biasing member being configured to impart a first bias force in a first direction throughout the stowed position to the deployed position to bias the seat back into the stowed position; and
   a second biasing member coupled to each of the seat back and the bed frame,
   the second biasing member being configured to impart a second bias force in a second direction opposing the first direction throughout the stowed position to the deployed position to bias the seat back into the deployed position.

2. The vehicle of claim 1 further comprising a cushion member pivotally coupled to each of the bed frame and the seat back, the cushion member being configured to dampen pivoting of the seat back into each of the stowed position and the deployed position.

3. The vehicle of claim 1 wherein the seat further comprises a first back hinge and a second back hinge, and each of the first back hinge and the second back hinge are attached to the bed frame to facilitate pivotable coupling of the seat back to the bed frame.

4. The vehicle of claim 3 wherein the first biasing member and the second biasing member comprise a first spiral torsion spring and a second spiral torsion spring, respectively.

5. The vehicle of claim 4 wherein the first spiral torsion spring comprises a first end and a second end, and the second spiral torsion spring comprises a third end and a fourth end.

6. The vehicle of claim 5 wherein the first end is coupled to the first back hinge, the second end is coupled to the seat back, the third end is coupled to the second back hinge, and the fourth end is coupled to the seat back.

7. The vehicle of claim 6 wherein the first end comprises an inner radial end, the second end comprises an outer radial end, the third end comprises an inner radial end, and the fourth end comprises an outer radial end.

8. The vehicle of claim 7 wherein the seat back comprises a first support member adjacent to the first back hinge and a second support member adjacent to the second back hinge, and wherein the second and fourth ends are engaged with the first and second support members, respectively.

9. The vehicle of claim 8 wherein the first and second back hinges comprise respective first and second pivot pins that cooperate to define a pivot axis for the seat back.

10. The vehicle of claim 9 wherein the first end is attached to the first pivot pin and the third end is attached to the second pivot pin.

11. The vehicle of claim 10 further comprising a cushion member pivotally coupled to each of the bed frame and the seat back, the cushion member being configured to dampen pivoting of the seat back into each of the stowed position and the deployed position.

12. A vehicle comprising:
a vehicular frame; and
a utility bed coupled with the vehicular frame, the utility bed comprising:
a bed frame;
a seat comprising:
a seat bottom coupled with the bed frame;
a seat back pivotally coupled with the bed frame and pivotable about a pivot axis between a stowed position, a deployed position, and a neutral position between the stowed position and the deployed position;
a first spiral torsion spring comprising a first end and a second end, the first end being coupled with the bed frame and the second end being coupled with the seat back; and
a second spiral torsion spring comprising a third end and a fourth end, the second third end being coupled with the bed frame and the fourth end being coupled with the seat back; and
a cushion member pivotally coupled to each of the bed frame and the seat back,
the cushion member being configured to dampen movement of the seat back into each of the stowed position and the deployed position;
wherein the first and second spiral torsion springs are wound in opposite directions with respect to one another such that the first torsion spring imparts a first bias force throughout the stowed position to the deployed position opposite a second bias force imparted by the second torsion spring throughout the stowed position to the deployed position.

13. The vehicle of claim 12 wherein the utility bed is pivotally coupled with the vehicular frame and is pivotable between a hauling position and a cargo support position.

14. The vehicle of claim 12 wherein the seat bottom is rigidly coupled with the bed frame.

15. The vehicle of claim 12 wherein the first end comprises an inner radial end, the second end comprises an outer radial end, the third end comprises an inner radial end, and the fourth end comprises an outer radial end.

16. The vehicle of claim 15 wherein:
the seat further comprises a first back hinge attached to the bed frame and a second back hinge attached to the bed frame;
the seat back comprises a seat back frame;
the first end is coupled to the first back hinge; and
the third end is coupled with the second back hinge.

17. The vehicle of claim 16 wherein the seat back further comprises a first support member adjacent to the first back hinge and a second support member adjacent to the second back hinge, and wherein the second and fourth ends engage the first and second support members, respectively.

18. The vehicle of claim 17 wherein the first and second back hinges comprise respective first and second pivot pins that cooperate to define the pivot axis for the seat back.

19. The vehicle of claim 18 wherein the first end is attached to the first pivot pin and the third end is attached to the second pivot pin.

20. The vehicle of claim 19 wherein the utility bed is pivotally coupled with the vehicular frame and is pivotable between a hauling position and a cargo support position.

* * * * *